Figure 1:
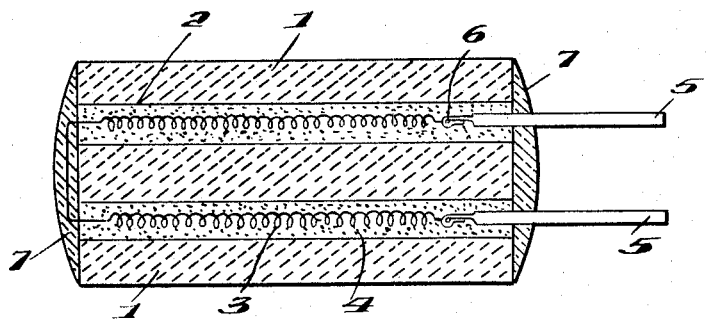

Nov. 15, 1966  F. KOLB ETAL  3,286,214

MEASURING RESISTANCE

Filed Feb. 3, 1964

INVENTORS
FRANZ KOLB,
KURT DITTERICH,
WALTER OBROWSKI,
FRITZ SCHWARZ,

BY Bailey, Stephens & Huettig

ATTORNEYS

United States Patent Office 3,286,214
Patented Nov. 15, 1966

3,286,214
MEASURING RESISTANCE
Franz Kolb, Kurt Ditterich, Walter Obrowski, and Fritz Schwarz, Hanau am Main, Germany, assignors to Deutsche Gold- und Silber-Scheideanstalt vormals Roessler, Frankfurt am Main, Germany
Filed Feb. 3, 1964, Ser. No. 341,920
Claims priority, application Germany, Feb. 2, 1963, D 40,816
2 Claims. (Cl. 338—269)

The present invention relates to an improved construction for measuring resistances, that is, resistances used for measuring purposes such as in resistance thermometers, which renders such resistances more economical to produce and more resistant to mechanical stresses.

Measuring resistances are known in which the rod shaped carrier element of ceramic material contains longitudinal bores in which the wound measuring coil is arranged. The connecting wires which are relatively thicker than the wire of the measuring coil project from one end of the carrier element. The hollow spaces remaining in the carrier element are completely or partially filled with a ceramic powder which is then sintered at a temperature below the melting point of such ceramic powder but considerably above the temperature at which the measuring resistance is intended to be used. The sintering causes a certain solidity of the filling powder together with the measuring wire but no firm bond with the carrier element is achieved. Aside from the fact that the sintering temperatures required in the production of such measuring resistances are around 1000° C. and above and at such high temperatures the measuring wire, which as a rule is of platinum or a platinum alloy, is already imperilled by the take-up of impurities, there is always the danger that in use of such measuring resistances that the sintered powder which practically has the form of a rod will undergo movements together with the measuring wire within the bores of the carrier element independent of the carrier element when they are subject to shocks. As a result the measuring wires are subjected to strong mechanical stresses and break prematurely.

According to the invention it was found that measuring resistances of improved resistance to mechanical stresses for use at temperatures up to about 700° C. can be produced more economically when a glass-like silicate mass in powdered form is employed to fill out the hollow spaces within the ceramic carrier element for the measuring coil and such glass-like mass is sintered below the softening temperature of such mass. It was unexpectedly found that a good bond could thereby be attained between the resulting sintered silicate mass and the ceramic carrier element without endangering the measuring wire by take-up of impurities. The good bond between the sintered mass and the ceramic carrier element is also obtained when a portion of the powdered glass-like silicate mass is replaced with non-glass-like ceramic substances such as aluminum oxide powder. The proportion of such glass-like silicate mass which can be replaced with the non-glass-like substances can be up to 99% by weight and preferably does exceed 80%.

Figure 2:
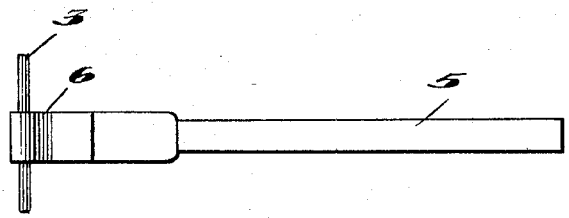
Figure 3:
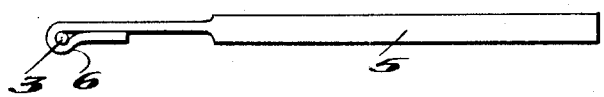

In the accompanying drawing:
FIG. 1 is a longitudinal section of a resistance thermometer according to the invention; and
FIGS. 2 and 3 show top and side enlarged views of the squeeze joint between the connecting conductor wires and the wire of the resistance coil.

In such drawing the rod shaped carrier element 1 is of a ceramic material, such as a high heat resistant oxide, for instance, aluminum oxide, and is provided with two longitudinal bores 3 which contain resistance coils 2, for example, of platinum wire, as well as the sintered glass-like silicate filling mass 4. The connecting conductor wires 5 are connected to the ends of the resistance wire coils 3 by the squeeze joints 6. Fused on glass caps 7 are provided at each end of the carrier element to seal off the ends of such carrier element.

A glass, for example, of the following composition by weight is used for the glass-like silicate mass:
66–70% $SiO_2$
5–10% $B_2O_3$
8–10% $Al_2O_3$
8–10% $Na_2O$
4–8% $Ca_2O$.

This glass in powder form can be used alone or, for example, admixed with aluminum oxide powder as described above for filling the spaces remaining in the bores after introduction of the resistance coils and be sintered, for example, by heating for about 3 hours at 600° C.

The connecting conductors 5 are consisting of silver, gold or a nickel-chromium alloy. The squeeze joints are welded together below the melting point of such metals by the heat during the sintering operation at 600 to 700° C.

We claim:
1. In a measuring resistance, a ceramic supporting element having at least one bore therein adapted to receive a wound wire resistance coil, a wound wire resistance coil carried in said bore and a sintered mixture of 1 to 20% by weight of a powdered glass-like silicate mass of the following composition by weight
66–70% $SiO_2$
5–10% $B_2O_3$
8–10% $Al_2O_3$
8–10% $Na_2O$
4–8% CaO and 99 to 80% by weight of a powdered non-glass-like ceramic filling the remaining space in the bore, said mixture having been sintered at a temperature below the softening point of said glass-like silicate mass to form a cohesive sintered mass.

2. In a measuring resistance, a ceramic supporting element having at least one bore therein adapted to receive a wound wire resistance coil, a wound wire resistance coil carried in said bore and a sintered mixture of 1 to 20% by weight of a powdered glass-like silicate mass of the following composition by weight
66–70% $SiO_2$
5–10% $B_2O_3$
8–10% $Al_2O_3$
8–10% $Na_2O$
4–8% CaO and 99 to 80% by weight of a powdered aluminum oxide filling the remaining space in the bore, said mixture having been sintered at a temperature of about 600–700° C. which is below the softening point of said glass-like silicate mass to form a cohesive sintered mass.

References Cited by the Examiner
UNITED STATES PATENTS

| | | | |
|---|---|---|---|
| 1,463,005 | 7/1923 | Dalton | 338—261 |
| 2,012,977 | 9/1935 | Trent et al. | 338—241 |
| 2,280,367 | 4/1942 | Barton | 338—241 |
| 2,622,133 | 12/1952 | Dorst | 338—274 X |
| 2,703,833 | 3/1955 | Vanvor | 338—28 |
| 3,005,171 | 10/1961 | Beckman | 338—28 |
| 3,114,125 | 12/1963 | Werner et al. | 338—28 |
| 3,134,956 | 5/1964 | Boggs | 338—273 |

RICHARD M. WOOD, *Primary Examiner.*
V. Y. MAYEWSKY, *Assistant Examiner.*